United States Patent [19]

Winterton

[11] Patent Number: 5,461,995
[45] Date of Patent: Oct. 31, 1995

[54] ROTARY ROW CLEANER WITH REVERSIBLE SPRING

[75] Inventor: Dean A. Winterton, Paw Paw, Lee County, Lee, Ill. 60530

[73] Assignees: Dean A. Winterton; Paw Paw Farmer's Factory Co., Lee, both of Ill.; part interest to each

[21] Appl. No.: 201,770

[22] Filed: Feb. 25, 1994

[51] Int. Cl.⁶ .................................. A01C 5/06
[52] U.S. Cl. .................. 111/139; 111/143; 111/157; 111/52; 172/307; 172/551; 172/624.5; 172/705
[58] Field of Search ................... 111/139, 140, 111/143, 157, 52; 172/624.5, 307, 484, 705, 551

[56] References Cited

U.S. PATENT DOCUMENTS

| 4,004,640 | 1/1977 | Bland | 172/710 |
|---|---|---|---|
| 4,214,537 | 7/1980 | Bailey et al. | 111/62 X |
| 4,275,670 | 6/1981 | Dreyer | 111/61 X |
| 4,377,979 | 3/1983 | Peterson et al. | 111/52 |
| 4,461,355 | 7/1984 | Peterson et al. | 172/156 |
| 4,553,607 | 11/1985 | Behn et al. | 172/156 |
| 4,660,653 | 4/1987 | Mayeda et al. | 172/522 |
| 4,693,331 | 9/1987 | Johnson et al. | 180/135 |
| 4,700,785 | 10/1987 | Bartusek et al. | 172/705 |
| 4,702,323 | 10/1987 | Smit et al. | 172/156 |
| 4,738,317 | 4/1988 | Bedney | 172/624.5 |
| 4,744,316 | 5/1988 | Lienemann et al. | 111/69 |
| 4,785,890 | 11/1988 | Martin | 172/29 |
| 4,947,770 | 8/1990 | Johnson | 111/121 |
| 4,974,683 | 12/1990 | Hanig et al. | 172/156 |
| 5,076,180 | 12/1991 | Schneider | 111/139 |
| 5,152,349 | 10/1992 | Roden | 172/177 |
| 5,163,518 | 11/1992 | Foley | 172/462 |
| 5,341,754 | 8/1994 | Winterton | 111/139 |

OTHER PUBLICATIONS

Yetter brochure "Your One-Stop Headquarters for Conservation Tillage Equipment", selected pages, Nov. 1984.

Primary Examiner—Randolph A. Reese
Assistant Examiner—Christopher J. Novosad
Attorney, Agent, or Firm—Leydig, Voit & Mayer, Ltd.

[57] ABSTRACT

A planter includes a pair of toothed wheels which sweep mulch away from the path followed by furrow opening discs. The sweeper wheels are carried on the trailing end of a parallel bar linkage attached to a tool bar by which the planter is pulled. As a result of the parallel bar linkage, the sweeper wheels may float upwardly and downwardly independently of the planter frame in order to conform to uneven ground. A spring acts on the parallel bar linkage and may be adjusted either to press the wheels downwardly into the ground if the mulch is hard and dense or to urge the wheels upwardly and relieve some of the weight of the wheels from the ground if the mulch is loose and the underlying soil is relatively fine.

8 Claims, 3 Drawing Sheets

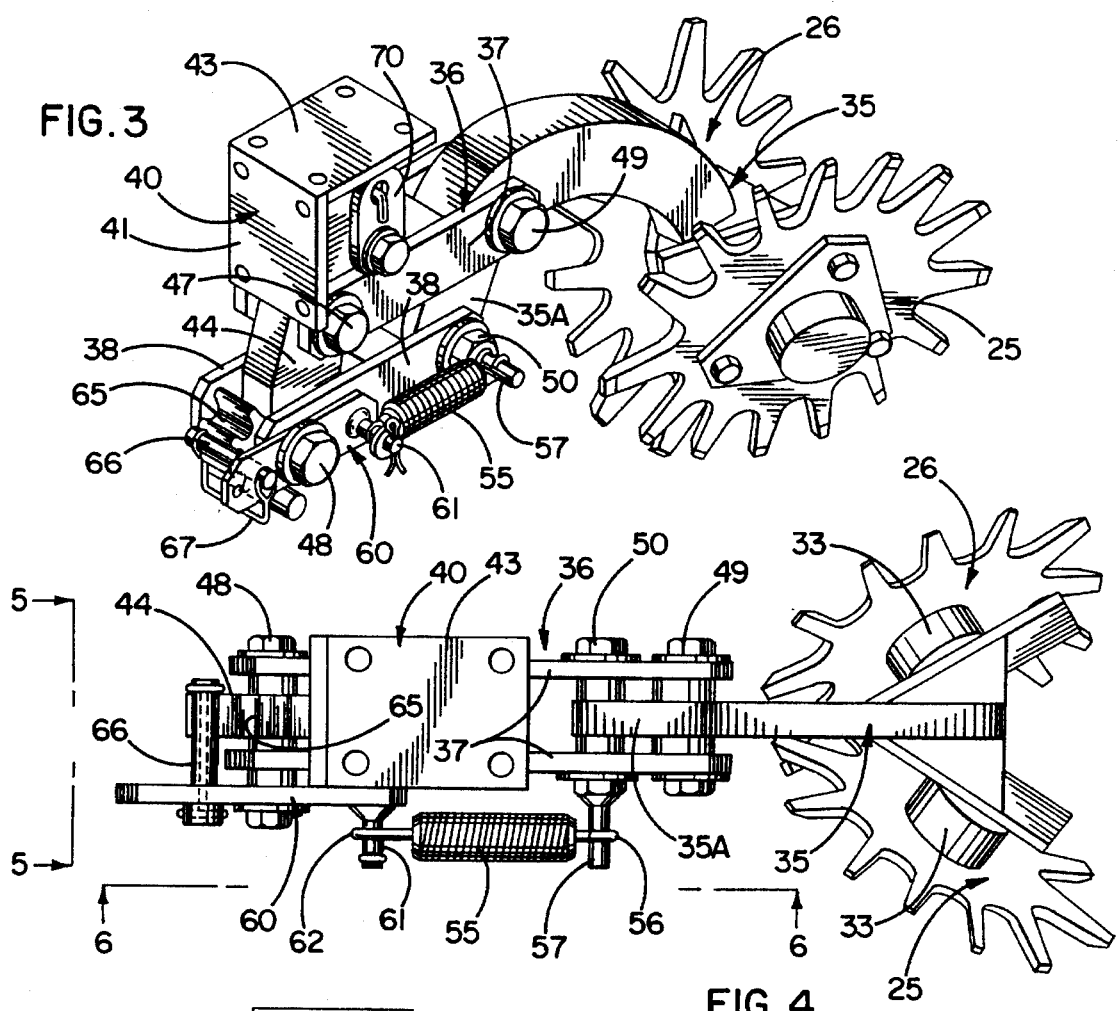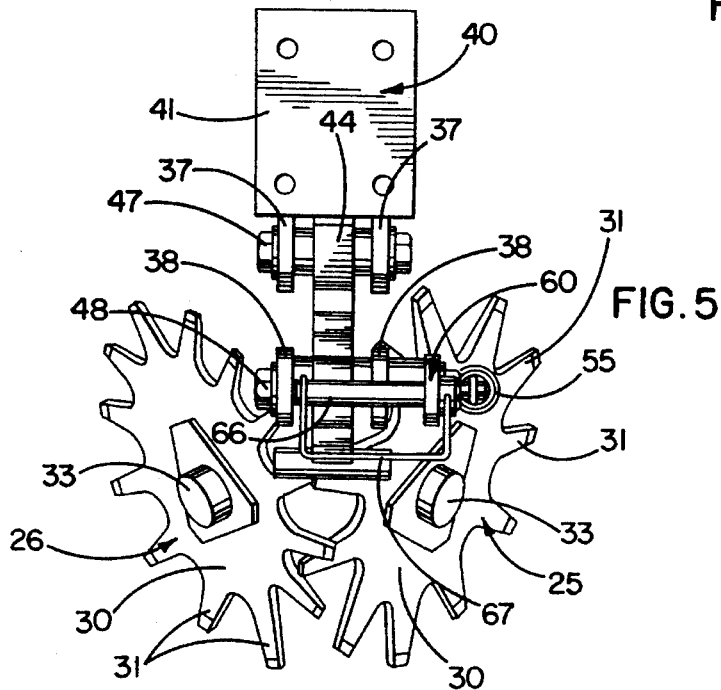

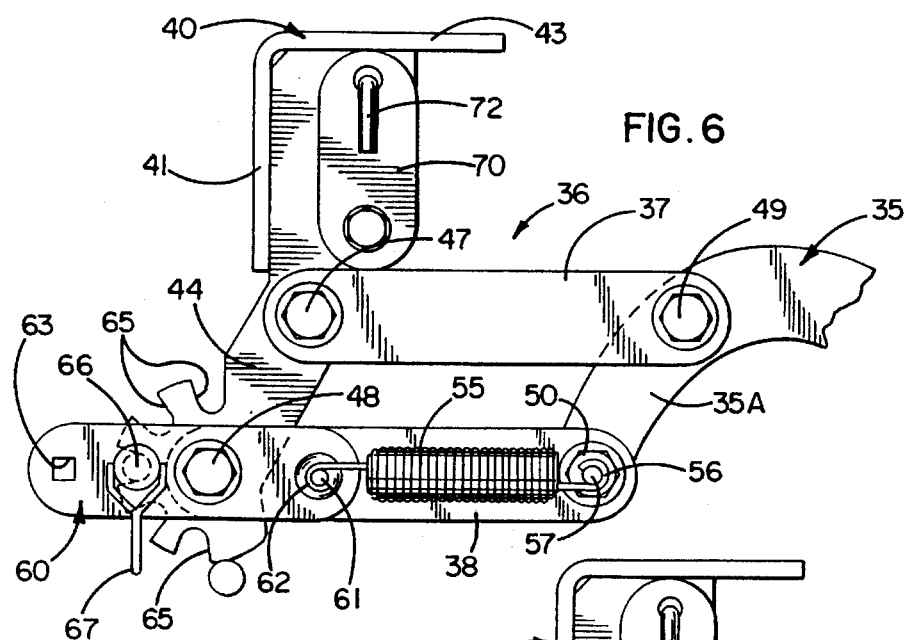
FIG. 6
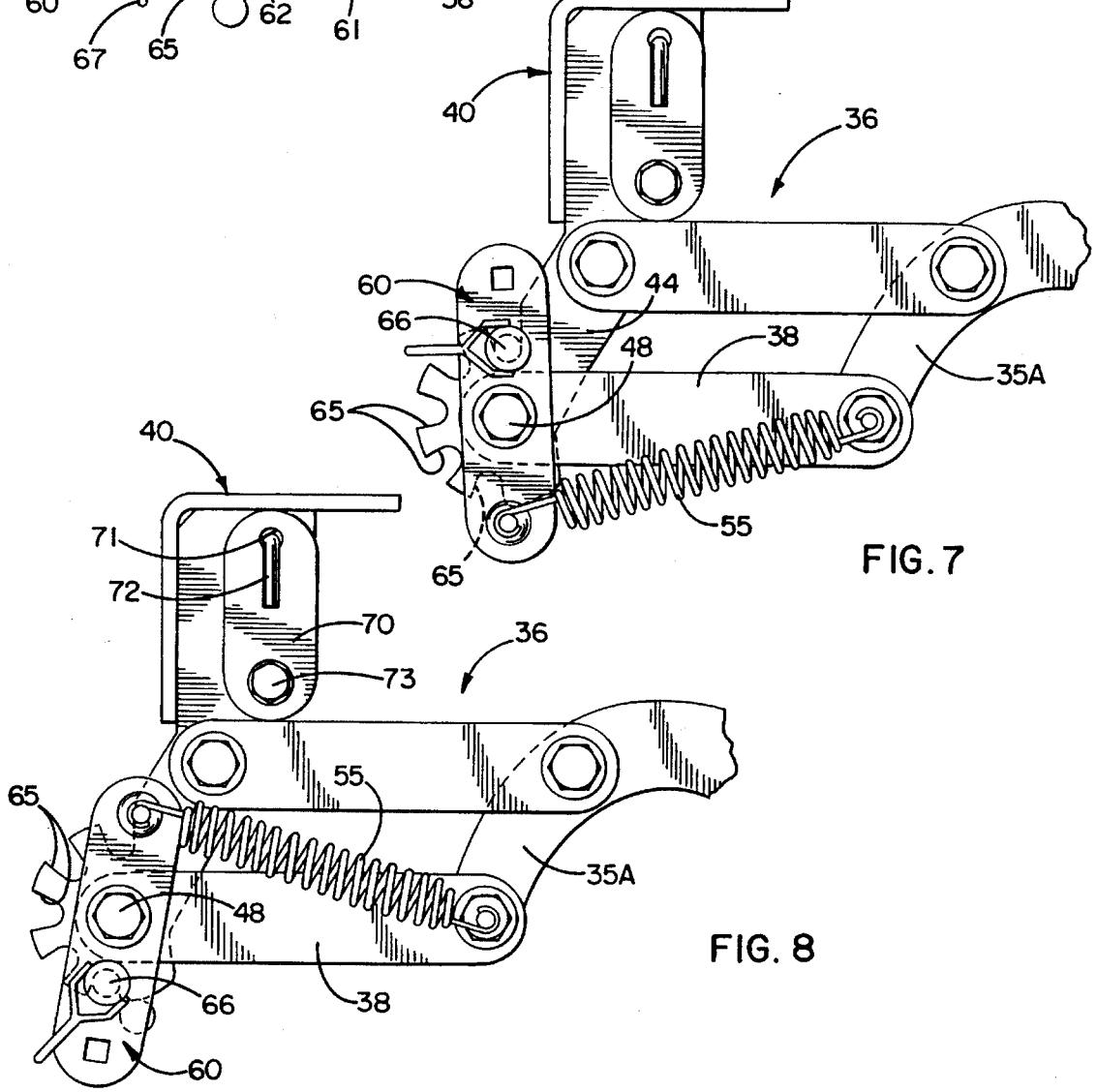
FIG. 7
FIG. 8

ROTARY ROW CLEANER WITH REVERSIBLE SPRING

BACKGROUND OF THE INVENTION

The present invention relates generally to ground-working apparatus and, more particularly, to ground-working apparatus in which a ground-working implement is carried on the rear ends of parallel bars.

Commonly assigned Winterton U.S. application Ser. No. 07/863,219, filed Apr. 3, 1992, now U.S. Pat. No. 5,341,754 discloses a rotary, ground-driven row cleaner for use in conservation tillage farming (i.e., no-till or low-till) and particularly useful in conjunction with row planter units. Several planter units may be attached to an elongated and laterally extending tool bar adapted to be pulled forwardly across the field by a tractor.

The row cleaner of the aforementioned application comprises two toothed wheels which are located so as to sweep residue (e.g., organic mulch) laterally away from the path followed by a rotatable coulter and by furrow opening means which may take the form of a pair of forwardly conveying discs adapted to create a furrow in the soil. The sweeper wheels are supported on parallel bars attached to the tool bar and mounting the sweeper wheels for up and down floating to enable the sweeper wheels to follow uneven ground and effectively remove residue with very little disturbance of the soil. A spring acts on the parallel bars and biases the sweeper wheels downwardly into engagement with the ground.

While the apparatus of the aforementioned application represents a significant advance over the prior art, problems are sometimes encountered in effectively using the apparatus in widely varying residue conditions. If the residue is hard and tightly packed, greater downward pressure is necessary to enable the wheels to sweep the residue cleanly away from the path followed by the furrow openers. On the other hand, if the residue or the soil is fine and loose, the sweeper wheels may engage the soil with such pressure as to overly agitate and till the soil.

SUMMARY OF THE INVENTION

The general aim of the present invention is to provide new and improved apparatus which may be easily adjusted to enable the working implement to engage the ground with various degrees of pressure and thereby enable the implement to function effectively in widely varying soil conditions.

A more detailed object of the invention is to provide apparatus in which the spring not only may be adjusted as necessary to change the downward force exerted on the implement but also may be adjusted to exert upward force on the implement so as to relieve some of the weight of the implement from the soil when very fine and loose soil is being worked.

The invention also resides in the relatively simple, inexpensive and compact mechanism which is used to adjust and reverse the spring force.

These and other objects and advantages of the invention will become more apparent from the following detailed description when taken in conjunction with the accompanying drawings.

BRIEF DESCRIPTION OF THE DRAWINGS

FIG. 3 is an enlarged perspective view of the row cleaner.

FIG. 4 is a top plan view of the row cleaner shown in FIG. 3.

FIG. 5 is a front elevational view as seen along the line 5—5 of FIG. 4.

FIG. 6 is a side elevational view as seen along the line 6—6 of FIG. 4.

FIGS. 7 and 8 are views similar to FIG. 6 but show the spring set in differently adjusted positions.

Figure 1:
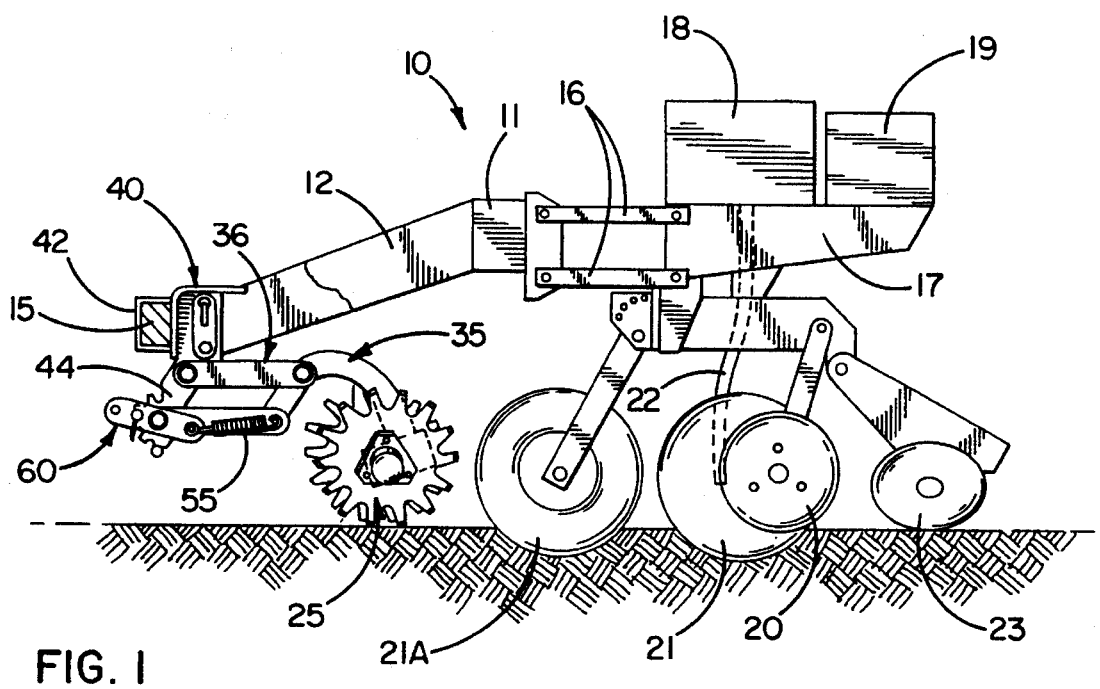
FIG. 1 is a side elevational view showing, in somewhat schematic form a typical planter unit equipped with apparatus in the form of a new and improved row cleaner incorporating the unique features of the present invention.
Figure 2:
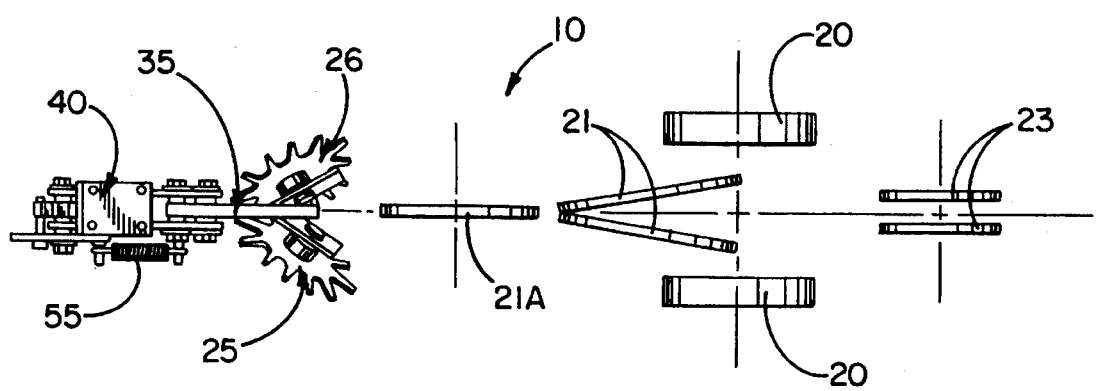
FIG. 2 is an enlarged top plan view showing the row cleaner and schematically showing other components of the planter unit.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention has been shown in the drawings in conjunction with a row planter unit 10. For the most part, the planter 10 itself is of conventional construction and will be described only briefly.

In general, the planter 10 comprises a main frame member 11 with a forwardly extending component 12 attached to a laterally extending tool bar 15. The latter is adapted to be pulled by a tractor and may support several laterally spaced planters.

Parallel links 16 are pivotally connected between the frame 11 and a rear frame component 17 which supports a seed hopper 18 and preferably a pesticide hopper 19. The frame 17 is supported by a pair of laterally spaced depth gauge wheels 20 located on opposite sides of furrow opening means, the latter herein being formed by two laterally spaced and generally vertical rotatable discs 21 which are inclined so as to converge toward one another upon progressing forwardly. As the planter 10 is pulled forwardly, the discs 21 penetrate the earth to open a narrow furrow whose depth is determined by the setting of the gauge wheels 20. A coulter 21A is mounted in a conventional location on the planter frame 17 and slices vertically into the soil ahead of the discs 21 to facilitate opening of the furrow by the discs.

Seeds metered from the hopper 18 are delivered into the open furrow by means of a dispensing tube 22 leading downwardly from the hopper. Thereafter, the furrow is closed by a pair of laterally spaced press wheels 23 which trail the discs 21.

In no-till or low-till farming, the field is not plowed or cultivated to any significant degree between successive crops. The harvesting of row crops from a prior planting leaves behind a residue of live and dead vegetation and plant stubble, the residue sometimes being called residual mulch. It is desirable to remove the mulch from in front of the furrow opening discs 21 of the advancing planter unit 10 while leaving mulch between adjacent rows and while leaving the soil substantially undisturbed. This is achieved by means of a row cleaner implement formed by a pair of rotatable sweeper wheels 25 and 26 positioned ahead of the furrow opening discs.

In the present instance, the sweeper wheels 25 and 26 are identical to one another and each comprises a metal hub 30 (FIG. 5) with a series of angularly spaced and radially extending teeth 31. The ends of the teeth preferably are pointed.

Bearing assemblies 33 rotatably support the wheels 25 and 26 and attach the wheels to the lower end portion of a mounting bracket 35 having an upright leading portion 35A. The bearing assemblies extend laterally from opposite sides of the bracket 35 and are located such that the wheel 25 slightly leads the wheel 26. Each bearing assembly is angled downwardly and forwardly so as to locate the centers of the wheels on opposite sides of a vertical plane in the path of travel of the discs 21 at the point of convergence thereof. As the planter 10 is pulled forwardly, the wheels 25 and 26 are rotated by virtue of engaging the ground and act to sweep mulch laterally away from the path of the trailing furrow opening discs 21.

The mounting bracket 35 which supports the wheels 25 and 26 is carried by a parallel linkage 36 which enables limited up and down floating of the wheels so that the vertical position of the wheels may conform to undulations of the ground. Herein, the parallel linkage 36 comprises a pair of upper and a pair of lower parallel bars 37 and 38 which extend rearwardly from a front mounting bracket 40. The latter includes a first flat plate 41 which is connected rigidly to the tool bar 15 by, for example, a pair of laterally spaced U-bolts 42 (FIG. 1). The bracket 40 also includes a second plate 43 integral with and extending rearwardly from the plate 41. An arm 44 is welded to and is centered laterally between the plates and projects downwardly and forwardly from the plate 41.

Upper and lower pivots 47 and 48 swingably connect the forward end portions of the upper bars 37 and 38, respectively, to the arm 44. Generally similar upper and lower pivots 49 and 50 swingably connect the rear end portions of the bars 37 and 38 to the leading portion 35A of the mounting bracket 35 for the sweeper wheels 25 and 26. As a result of this arrangement, the sweeper wheels 25 and 26 are capable of moving upwardly and downwardly relative to the tool bar 15 but without swinging through any substantial arc during such movement.

In accordance with the present invention, the parallel linkage 36 is equipped with a spring 55 which may be adjusted to either force the sweeper wheels 25 and 26 downwardly into the residue with various degrees of pressure or to bias the sweeper wheels in an upward direction and relieve some of the weight of the wheels from the ground. If the residue is hard and tightly packed, the spring is adjusted to force the wheels downwardly and allow the wheels to work in a comparatively aggressive manner. If the residue is loose and the soil is relatively fine, the spring is adjusted to reduce the weight of the wheels and allow the wheels to sweep away the residue without unduly disturbing the soil.

More specifically, the spring 55 in this particular instance is a contractile spring having a rear hook 56 (FIG. 6) which is hooked around a rod 57. Herein, the rod is rigid with and extends from one end of the rear lower pivot 50. It will be appreciated, however, that the rod could be fixed directly to and extend from one side of one of the bars 37, 38 and need not necessarily be located at the pivot 50.

In carrying out the invention, provision is made of a lever 60 which may be selectively adjusted for purposes of changing the magnitude and/or direction of the force exerted by the spring 55. In the particular embodiment which has been shown, the lever 60 is simply an elongated steel member which is supported between its ends to turn on the front lower pivot 48. A rod 61 (FIG. 6) is fixed to and extends laterally from one end portion of the lever and serves as a mounting for the front hook 62 of the spring. Formed in the opposite end portion of the lever is a hole 63, preferably square, for receiving the square driver of a ratchet wrench (not shown) which may be used to turn the lever against the force of the spring.

The lever 60 is adapted to be turned to and releasably held in extreme positions shown in FIGS. 7 and 8 and in various intermediate positions located between the extreme positions. To these ends, the front end of the arm 44 is formed with a plurality of recesses in the form of forwardly opening notches 65. The notches are spaced angularly from one another along an arc which is struck about a center lying on the axis of the lower front pivot 48. Herein, there are five equally spaced notches. The center notch lies in the same horizontal plane that contains the axis of the pivot 48. Two notches are located above the center notch while the remaining two notches are located below the center notch.

A circular hole is formed through the lever 60 between the pivot 48 and the square hole 63 and is adapted to receive a removable pin 66 which also is adapted to seat within a selected one of the notches 65 in order to hold the lever in a selected angular position against the force of the spring 55. The pin is retained axially by a conventional spring clip 67 which, when released, allows the pin 66 to be retracted endwise out of the hole in the lever. A bolt and nut could be used in lieu of the pin and the clip.

FIG. 6 shows the lever 60 in a neutral position in which the pin 66 is seated in the center notch 65. When the lever is in that position, the axis of the spring 55 (i.e., a straight line extending between the connecting points of the spring) is located substantially in the same horizontal plane containing the axes of the lower pivots 48 and 50. Under these circumstances, the spring exerts substantially no vertical force on the linkage 36 when the bars 37 and 38 thereof are horizontally disposed. If the rear ends of the bars swing downwardly as a result of the wheels 25 and 26 encountering a valley in the soil, the axis of the spring moves clockwise below the aforementioned horizontal plane and thus the spring exerts an upward force tending to restore the bars to their original position. Conversely, if the wheels encounter a ridge and cause the rear ends of the bars to swing upwardly, the axis of the spring moves counterclockwise above horizontal and exerts a downward force on the bars.

In FIG. 7, the lever 60 has been shown as having been turned clockwise from the position of FIG. 6 and the pin 66 has been shown as seated in the uppermost notch 65. The spring thus is positioned with its axis turned counterclockwise below a horizontal plane containing the pivot 48 and, as a result, the spring exerts a downward force tending to swing the bars 37 and 38 downwardly about the pivots 47 and 48 and tending to press the wheels 25 and 26 downwardly into the soil. The lever is located in the position shown in FIG. 7 if the residue is hard and tightly packed thereby requiring that the wheels dig aggressively into the residue to effectively sweep it away. When the lever is positioned as shown in FIG. 7, the spring constantly exerts a downward force on the bars 37 and 38 as the rear ends of the bars swing upwardly and downwardly, the magnitude of the force changing depending upon the particular position of the bars. By turning the lever to a position (not shown) in which the pin 66 is seated in the notch 65 between the center notch and the uppermost notch, the downward spring force may be reduced so that the wheels 25 and 26 still are constantly biased downwardly but work less aggressively than in the case where the pin is in the uppermost notch.

FIG. 8 shows the lever 60 turned counterclockwise from the position of FIG. 6 such that the pin 66 is seated in the lowermost notch 65. When the lever is so positioned, the axis of the spring is turned clockwise above the horizontal plane containing the pivot 48. By virtue thereof, the spring biases the bars 37 and 38 upwardly about the pivot 48 to reduce the effective weight of the bars, the wheels 25 and 26 and the bracket 35 and to cause the wheels to engage the ground with significantly less force than is the case when the lever is in any of the previously described positions. Thus, if the residue is very fine and loose, the wheels may be set to work less aggressively so as to minimize disturbance of the underlying soil. By turning the lever 60 so that the pin 66 is located in the notch 65 between the center and lowermost notches, the spring may be set so that it still biases the bars 37 and 38 upwardly but with less force then when the lever is positioned with the pin in the lowermost notch.

When the planter unit 10 is operating in a cleanly tilled field, the wheels 25 and 26 may be lifted to a raised position by preferably positioning the lever 60 as shown in FIG. 8 and by lifting the bars upwardly about the pivots 47 and 48. Thereafter, a pair of ears 70 may be swung downwardly from a stored position (FIG. 8) to an active position in which holes 71 in the ears are located beneath the upper bars 37. When a pin 72 is inserted through the holes, the wheels are held in their upwardly raised position to avoid disturbing the soil of the cleanly tilled field. The ears 70 are located on opposite sides of the arm 44 and are supported on a horizontal pivot 73 extending through the arm. When the ears are in their stored position, the pin 72 extends through the holes 71 and an aligned hole in the arm 44 to hold the ears in the stored position.

From the foregoing, it will be apparent that the present invention brings to the art new and improved apparatus in which the spring 55 may be adjusted to bias the wheels 25 and 26 either downwardly or upwardly with various degrees of force in order to compensate for residue and soil conditions. By virtue thereof, the apparatus may be used more effectively in widely varying conditions.

I claim:

1. Apparatus for use with a planter unit having an elongated and laterally extending bar by which the planter unit is pulled forwardly, the planter unit having means for opening a furrow in minimally tilled or untilled soil, said apparatus comprising a pair of vertically spaced and generally parallel bars having forward ends pivotally connected to said elongated bar to swing upwardly and downwardly independently of said furrow opening means, said parallel bars extending rearwardly from said elongated bar, a mounting bracket pivotally connected to the rear ends of said parallel bars, a pair of toothed sweeper wheels rotatably supported by said mounting bracket and located ahead of said furrow opening means, said wheels being positioned in engagement with the soil and being positioned with their centers on opposite sides of a vertical plane in the path of travel of said furrow opening means whereby forward movement of said planter unit rotatably drives said wheels to cause the wheels to pull residue in laterally opposite directions away from the path of the advancing furrow opening means, the improvement in said apparatus comprising, spring means having first end means connected to said parallel bars, said spring means being selectively adjustable between a first position biasing the rear ends of said bars downwardly and a second position biasing the rear ends of said bars upwardly whereby said spring means presses said wheels into the soil when said spring means is in said first position and reduces the weight of the wheels on the soil when said spring means is in said second position, said spring means being adjustable between said first and second positions while said first end means of said spring means remain connected to said parallel bars and without need of said first end means being disconnected from said bars.

2. Apparatus as defined in claim 1 further including a front mounting bracket rigidly secured to said elongated bar and serving to pivotally connect the forward ends of said parallel bars to said elongated bar, the forward end of one of said parallel bars being connected to said front bracket to swing upwardly and downwardly about a predetermined pivot axis, a lever pivotally mounted on said front bracket, said spring means comprising an elongated spring having first and second ends connected to said lever and said one bar, respectively, said lever being turnable between a first position in which said first end of said spring is located on one side of said pivot axis and a second position in which said first end of said spring is located on the opposite side of said pivot axis, and means for releasably holding said lever in each of its positions.

3. Apparatus as defined in claim 2 in which said one bar is the lowermost one of said pair of parallel bars, said lever being turnable about said pivot axis.

4. Apparatus as defined in claim 3 in which said holding means comprise a series of recesses formed in said front bracket and spaced from one another around an arc struck about said axis, and pin means extending removably through said lever and into any selected one of said recesses.

5. Ground-working apparatus adapted to be moved forwardly along the ground, said apparatus comprising a front mounting bracket, upper and lower generally parallel bars having forward ends pivotally connected to said bracket to swing upwardly and downwardly about upper and lower generally horizontal axes, respectively, a rear mounting bracket pivotally connected to the rear ends of said bars, a ground-working implement attached to said rear mounting bracket, a lever supported to turn about said lower axis independently of said lower bar, a spring having a first end connected to said lever at a location offset radially from said lower axis and having a second end connected to said lower bar, said lever being turnable between first and second positions in which a straight line extending between the ends of said spring is located below and above, respectively, said lower axis, said spring biasing the rear ends of said bars downwardly and pressing said implement into the ground when said lever is in said first position and biasing the rear ends of said bars upwardly and reducing the weight of said implement on the ground when said lever is in said second position.

6. Ground-working apparatus as defined in claim 5 further including means for releasably holding said lever in each of said positions, said holding means comprising a series of recesses formed in said front bracket and spaced from one another around an arc struck about said lower axis, and means supported at least in part by said lever and adapted to extend into any selected one of said recesses.

7. Ground-working apparatus as defined in claim 6 in which one of said recesses lies substantially in a plane containing said axis and said second end of said spring, there being other recesses located above said plane and still other recesses located below said plane.

8. Ground-working apparatus adapted to be moved forwardly along the ground, said apparatus comprising a front mounting bracket, upper and lower generally parallel bars having forward ends pivotally connected to said bracket to swing upwardly and downwardly about upper and lower generally horizontal axes, respectively, a rear mounting bracket pivotally connected to the rear ends of said bars, a ground-working implement attached to said rear mounting bracket, a lever supported to turn about one of said axes independently of the respective bar, a spring having a first end connected to said lever at a location offset radially from said one axis and having a second end connected to the respective bar, said lever being turnable between first and second positions in which a straight line extending between the ends of said spring is located below and above, respectively, said one axis, said spring biasing the rear ends of said bars downwardly and pressing said implement into the ground when said lever is in said first position and biasing the rear ends of said bars upwardly and reducing the weight of said implement on the ground when said lever is in said second position.

* * * * *